April 16, 1963 W. R. MACLAY ETAL 3,086,088

MAGNETIC TRANSDUCER WITH SHOE-EQUIPPED FLOATING HEAD

Filed June 30, 1958 5 Sheets-Sheet 1

INVENTORS
WILLIAM R. MACLAY
HARRY CHARNETSKY, JR.

INVENTORS
WILLIAM R. MACLAY
HARRY CHARNETSKY, JR.

April 16, 1963 W. R. MACLAY ETAL 3,086,088

MAGNETIC TRANSDUCER WITH SHOE-EQUIPPED FLOATING HEAD

Filed June 30, 1958 5 Sheets-Sheet 3

INVENTORS
WILLIAM R. MACLAY
HARRY CHARNETSKY, JR.

April 16, 1963 W. R. MACLAY ET AL 3,086,088

MAGNETIC TRANSDUCER WITH SHOE-EQUIPPED FLOATING HEAD

Filed June 30, 1958 5 Sheets-Sheet 4

INVENTORS
WILLIAM R. MACLAY
HARRY CHARNETSKY, JR.

April 16, 1963 W. R. MACLAY ETAL 3,086,088

MAGNETIC TRANSDUCER WITH SHOE-EQUIPPED FLOATING HEAD

Filed June 30, 1958 5 Sheets-Sheet 5

INVENTORS
WILLIAM R. MACLAY
HARRY CHARNETSKY, JR.

United States Patent Office 3,086,088
Patented Apr. 16, 1963

3,086,088
MAGNETIC TRANSDUCER WITH SHOE-EQUIPPED FLOATING HEAD

William R. Maclay, Endicott, and Harry Charnetsky, Jr., Binghamton, N.Y., assignors to International Business Machines Corporation, New York, N.Y., a corporation of New York Filed June 30, 1958, Ser. No. 745,631
16 Claims. (Cl. 179—100.2)

This invention relates to apparatus for manifesting intelligence on record media and more particularly to an improved mounting and supporting means for transducer components thereof.

In the electronic digital computer and data handling arts much use is made of a magnetizable record media for receiving information and storing such information until it is required. Magnetic transducers associated with magnetizable media such as magnetic tapes, discs, or drums are adapted to be mounted closely adjacent the magnetizable surface without actually touching the magnetizable surface during the recording or reading operation. When such magnetic transducers are utilized with a magnetic drum, or other rotary magnetizable record medium which will have some inherent eccentricity, suitable means must be provided for allowing the transducer to be as close as possible to the magnetizable medium without actually touching it and allowing the transducer to follow the eccentricity of the medium by movement toward and away from the center of rotation. However, this is the only direction which the transducer should be allowed to move. The transducer, and especially the movable components thereof must not move in the same direction as the movement of the record medium and also must not move transverse to the movement of the record medium.

When the magnetizable record medium and the transducer are utilized as a component of an electronic computer it is most important that there is no relative motion in the direction of movement of the record medium, since any relative motion as small as .0001 inch along the recording track can cause an error in the performance of the computer. This is because bits of information may be recorded in recording tracks around the periphery of the drum in areas, by way of example, only .012 inch in length, with each bit having an angular position relative to bits on suitable sync tracks which generate the clock pulses used to sample the outputs of the read heads. Therefore, any peripheral movement of the transducer will cause a delay or advance in timing, with respect to the sampling clock, and may create an error in the computer. It is also important that the movable magnetic transducer is not allowed to move in a direction transverse to the recording track. This of course would position the transducer away from the center of the recording track and result in correspondingly poor recording and readout.

It has been proposed to provide a transducer in combination with a magnetic record medium in which the sensing portion of the transducer is supported by the laminar film of fluid adhering to the moving record medium associated with the transducer apparatus. This is disclosed in the copending application Serial No. 552,005, entitled "Apparatus for Manifesting Intelligence on Record Media" which was filed December 9, 1955, in the name of William R. Maclay and George W. Scott and is now Patent 2,863,004, issued December 2, 1958. The present invention is somewhat similar to the apparatus of the aforesaid application in portions of the transducer apparatus while being an improvement thereon in the mounting and supporting means for the movable components of the transducer apparatus.

The principles and inventive concepts disclosed herein may be utilized with both a single head or a pair of magnetic transducers mounted in a single support and arranged to recirculate information, termed in the art a "revolver." A revolver for use with a magnetizable record medium of the type referred to, which revolver has shoes for supporting the sensing elements on a fluid film adhering to the record medium and means for adjusting the relative position of the transducer heads with respect to each other is disclosed in copending application Serial No. 693,859 for "Apparatus for Manifesting Intelligence on Record Media" filed by William R. Maclay on November 1, 1957, now Patent 3,034,109, issued May 8, 1962.

The present invention has as its primary object the provision of an arrangement for allowing a magnetic transducer to move toward and away from the rotative center of a rotatable magnetizable record medium to follow the movement of the record surface due to the inherent eccentricity of the record media mounting, while preventing any relative movement along the peripheral recording track on the record medium and also preventing any movement transverse to the recording track on the surface of the record medium.

It is an additional object of this invention to provide a pressure positioning mechanism for movable components of a magnetic transducer which positioning mechanism consists of a simple wire link having a pre-loaded pivot which is biased by means of a spiral spring and a push rod to position a shoe, rigidly connected to a core of a magnetic transducer, adjacent the magnetic record medium surface. The shoes and sensing cores are thereby referenced directly to the magnetic record medium surface by being supported on the laminar fluid boundary which adheres to the surface during rapid movement thereof.

It is a further object of this invention to provide an improved integral shoe and core lamination structure for a magnetic transducer providing simplicity and consistent signal readback. The shoe is constructed of a stack of plastic laminations having the laminations of the transducer core secured therewithin.

It is a further object of this invention to provide improved means for close calibration of the pressure with which the shoe is biased toward the surface of the record medium. The use of a simple conical or spiral spring insures this close calibration. This particular type of spring can be made to accurate limits and does not tend to buckle as a column which is a problem inherent with the use of the common helical compression spring.

Still another object of this invention is the provision of an improved structural arrangement for providing wide adjustment of the transducer elements in a revolver housing. The parts involved are relatively simple precisions castings and the outside of the revolver housing is shaped in accordance with the periphery of a cylindrical drum, therefore the adjustment of the transducer heads is along the periphery of the drum. Although the heads are adjustable relative to each other, they are also independently mounted and are therefore both referenced to the drum by their independent support on the laminar fluid boundary which will adhere to the drum surface during rapid movement thereof.

It is an additional object of this invention to provide an improved means for shielding the magnetic transducer heads in the revolver assembly from each other. The shielding means includes a heavy bar of aluminum which is integral with the housing and extends close to the clearance of the drum surface together with a separable shield of permeable magnetic material surrounding one of the transducer heads.

Other objects of the invention will be pointed out in the following detailed description and claims and illustrated in the accompanying drawings, which disclose, by way of examples, the principle of the invention and the best mode, which has been contemplated, of applying that principle.

Figure 1:
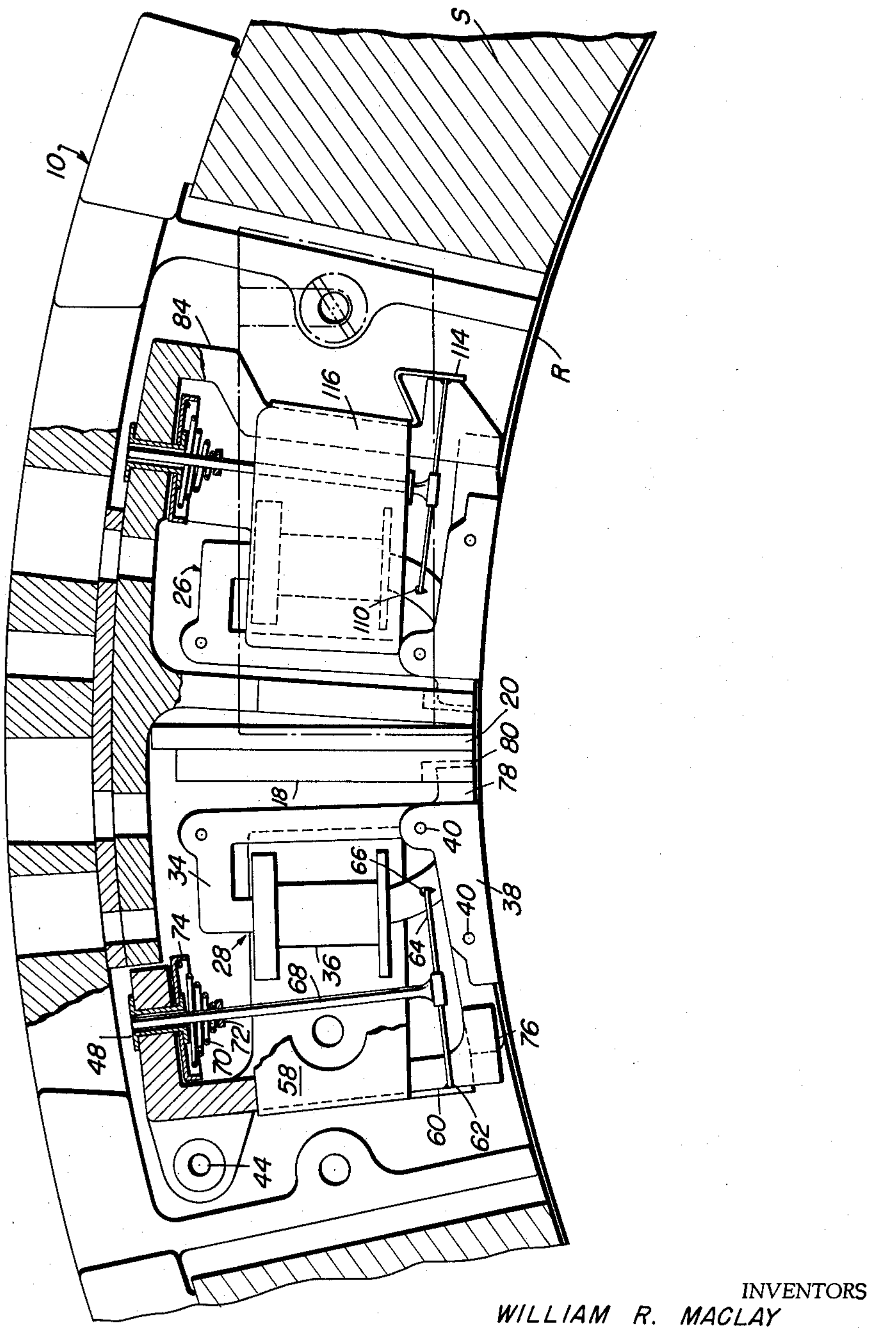
FIG. 1 is a side elevation view, partially in section, illustrating the principles of this invention as applied to a revolver associated with a rotatable magnetic record medium.

Briefly, the present invention comprises an improved mounting and supporting means for a transducer assembly. This mounting and supporting means is illustrated in combination for mounting the transducers of a revolver in FIGS. 1, 2, and 3 and for mounting a single transducer head in FIGS. 4, 5, 6, and 8. In the embodiments illustrated, the transducer assembly comprises a housing within which a stationary coil is secured. The center of the coil has an aperture for receiving one leg of a laminated core, which leg is mounted for movement relative to the coil. The other leg of the core is integral with the said one leg and constructed so as to allow a gap between the two legs which gap is movable toward and away from the surface of the record medium with which the transducer is associated. A shoe is rigidly secured to the core and has a relatively large surface adjacent the surface of the record medium such that the core which is attached to the shoe will be supported by the laminar film of fluid which closely adheres to the surface of the record during rapid movement thereof. The movable core and shoe assembly is pivotally connected to the support housing by means of a single simple wire link. There are pivotal connections provided both at the shoe and core and at the housing connection for the link which is generally an elongated loop shaped wire. A push rod is connected to the link and the upper end of the push rod is biased, to bias the core and shoe toward the surface of the housing, by means of a conical-shaped or spiral spring. This type of spring provides more accurate adjustment of the biasing pressure which must be provided upon the core and shoe assembly. The link will allow the shoe to move toward and away from the center of rotation of the rotatable record medium while preventing movement along the peripheral recording track in the direction of movement of the record medium. An improved shoe construction is provided for having a projecting tongue on each end thereof which cooperates with a slot in the mounting housing for preventing movement of the shoe and core construction in a direction perpendicular to the recording track along the surface of the rotatable record medium. The shoe per se is constructed of a number of plastic laminations which are bonded together with the laminations of the core near the center thereof. One of the laminations of the shoe functions as the tongue which cooperates in the slot of the housing. In the illustrated embodiment wherein the transducers are mounted by the described mounting means in a revolver assembly, there is also provided an improved adjusting means for adjusting the position of the transducers relative to each other in the revolver housing. The mating parts of the adjusting assembly have an arcuate configuration with a center of curvature coincident with the axis of the rotatable record medium whereby when one of the transducers is adjusted relative to the other the adjustment is along a path which is on an imaginary circle having a center coincident with the center of the rotatable record medium. The revolver is also provided with improved shielding means including a portion of the housing and a separable enclosing shield of magnetic material of high permeability.

Figure 2:
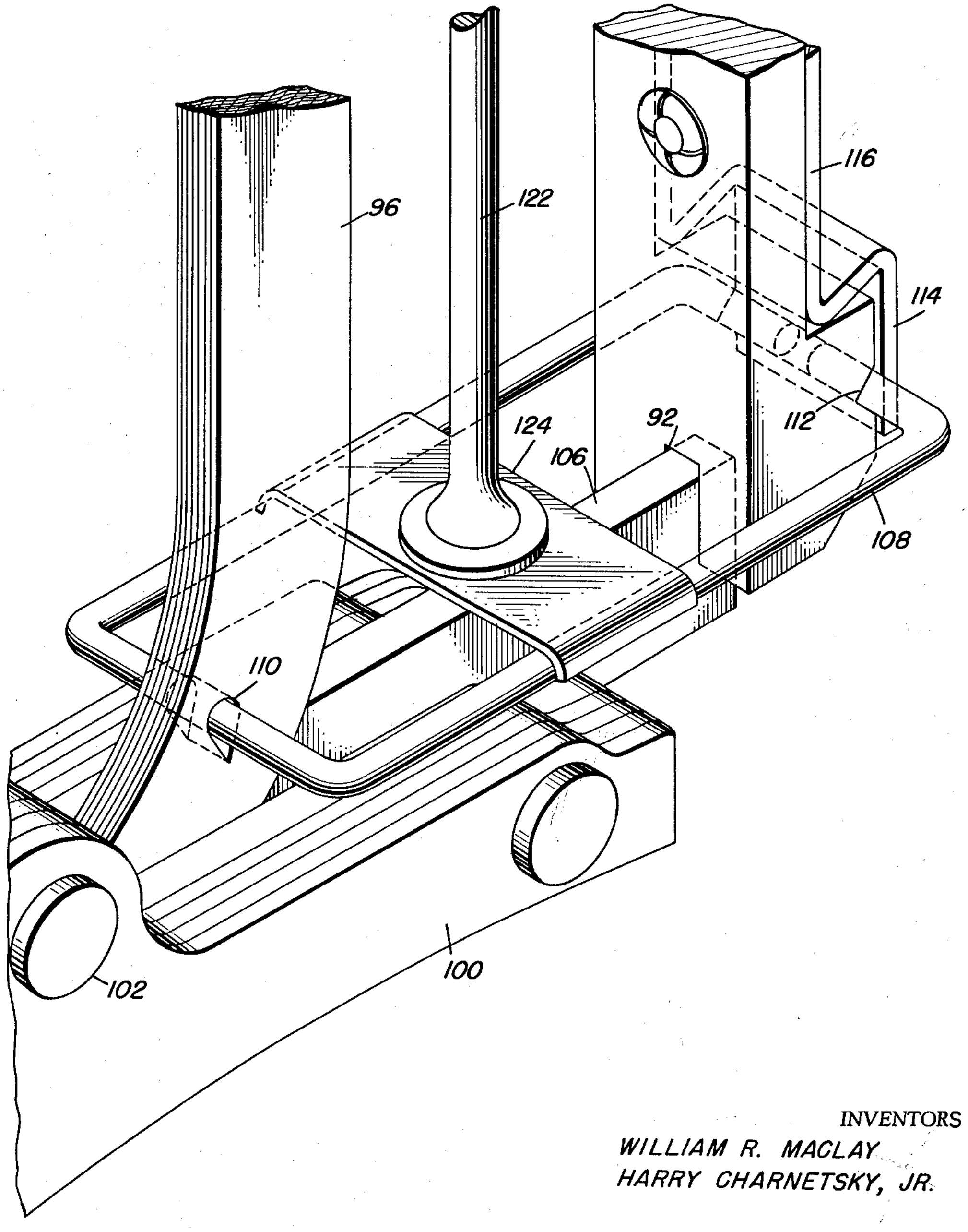
FIG. 2 is an enlarged perspective view illustrating the link mounting of the shoe and core of the magnetic transducer which is part of the revolver illustrated in FIG. 1.
Figure 3:
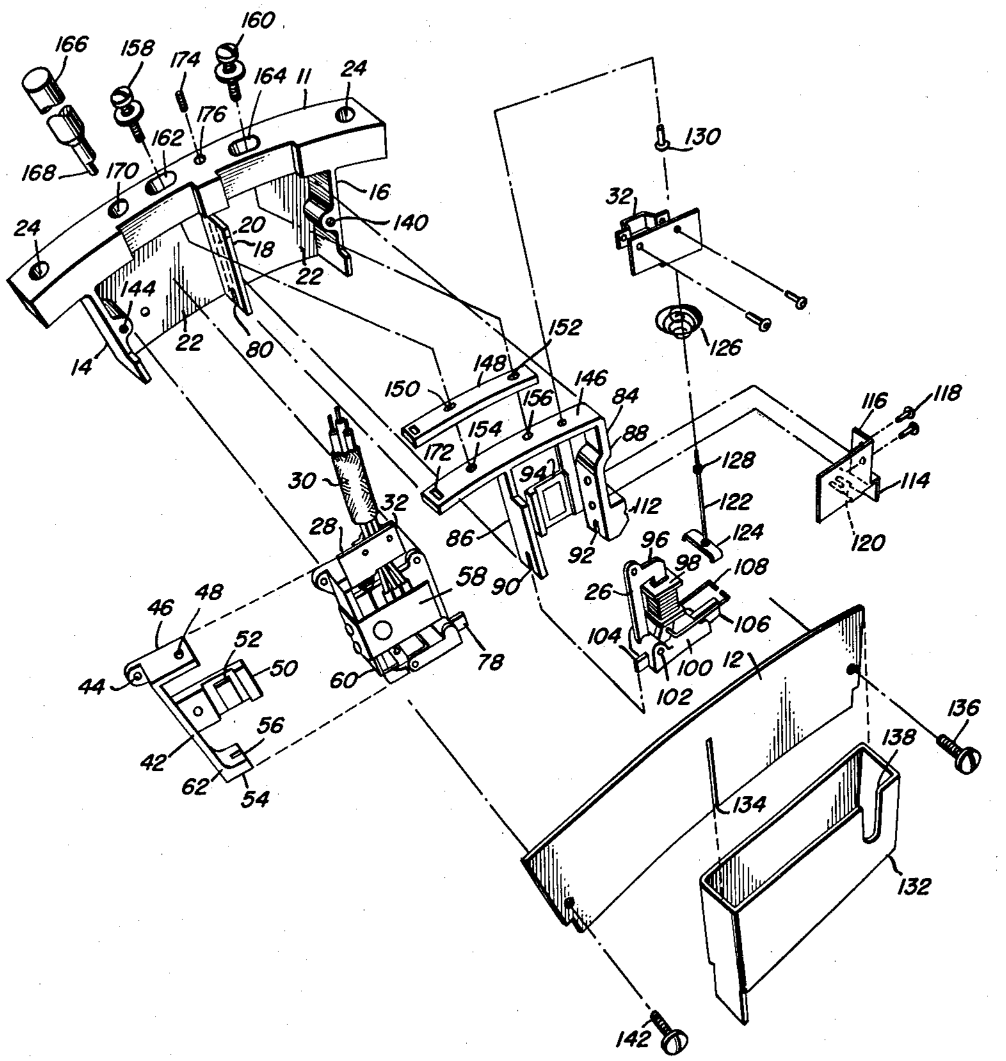
FIG. 3 is an exploded view showing the component parts of the revolver assembly.
Figure 4:
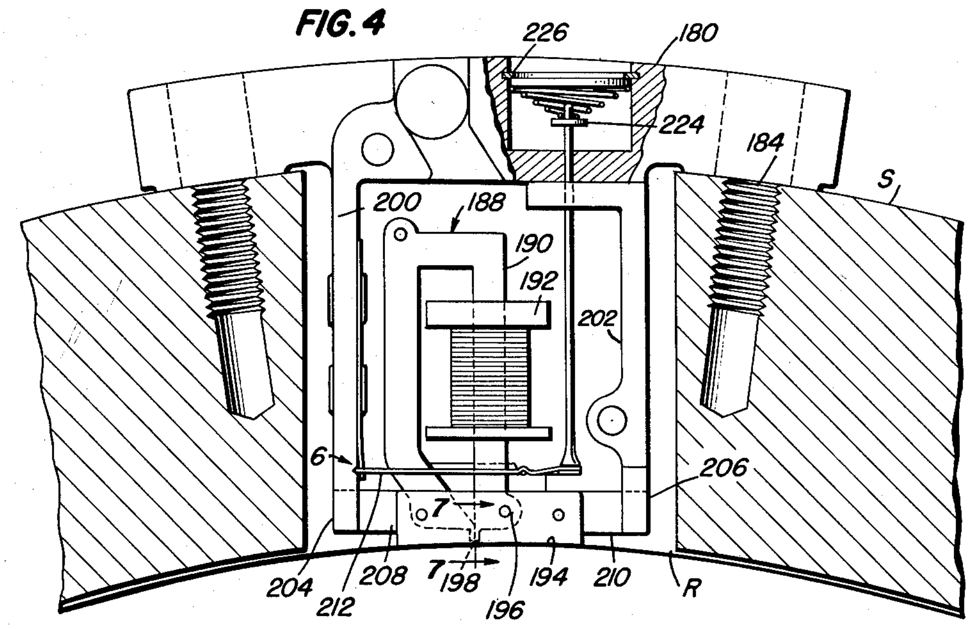
FIG. 4 is a side elevation view, partially in section, illustrating the principles of this invention as applied to a magnetic head associated with a rotatable magnetic record medium.
Figure 6:
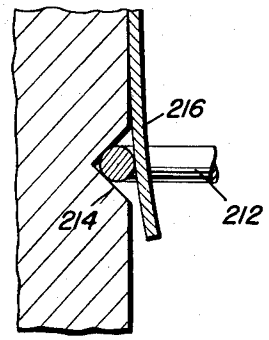
FIG. 6 is an enlarged side sectional elevation view showing a detail of the pivotal mounting of the link which is shown in small circle 6 of FIG. 4.
Figure 7:
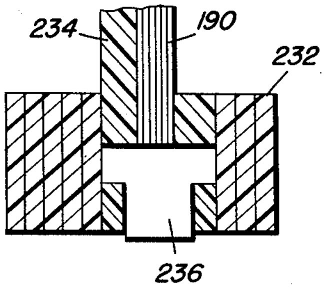
FIG. 7 is an enlarged sectional view along line 7—7 of FIG. 4 showing the laminated shoe and integral core lamination structure as well as the nonmagnetic insert in the gap in the transducer.
Figure 8:
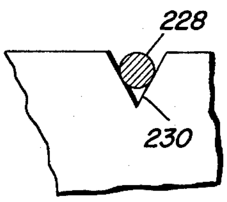
FIG. 8 is an enlarged detail view showing the pivotal mounting of the shoe and connection to the link which biases the shoe toward the surface of the record medium.
Figure 5:
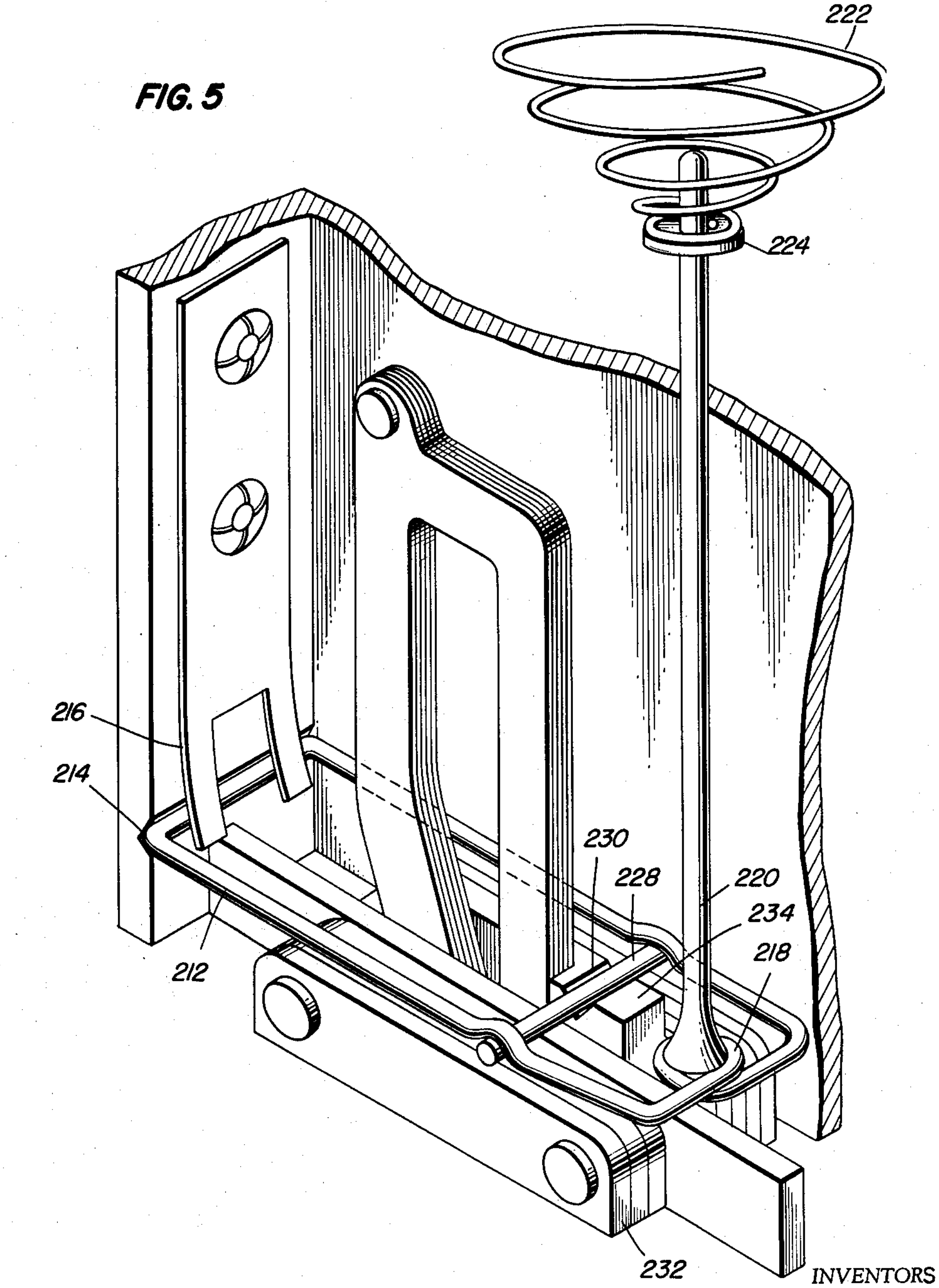
FIG. 5 is an enlarged perspective view showing the mounting means for mounting the movable components of the magnetic transducer head.

For a detailed description of the invention and the principles thereof as applied to a revolver associated with a rotatable record medium reference may be had to FIGS. 1, 2, and 3. The revolver is assembled in a housing 10 which housing includes a main supporting casting 11 and a front support plate 12, FIG. 3. The casting 11 has a pair of side walls 14 and 16, a relatively heavy center dividing wall 18 which has a vertical slot 20 adjacent thereto, and casting 11 also includes a back wall 22. This casting is designed to be relatively simple and may be produced of a light weight material such as aluminum. Mounting holes 24 are provided for mounting the housing on a suitable support S thereby positioning the housing adjacent the record member R as shown in FIG. 1.

Adapted to be mounted within the housing are a pair of magnetic transducer assemblies 26 and 28. These transducer assemblies are of course provided with suitable electrical connections indicated generally at 30 which may be held in place by a wire clip such as shown at 32.

Transducer assembly 28 includes a laminated core 34 one leg of which extends through a bobbin 36 having a coil wound thereon. A laminated shoe 38 having a relatively large bottom surface conforming to the curvature of the recording surface R is rigidly attached to the core laminations by suitable rivets 40.

An E-shaped mounting bracket 42 is provided for supporting the transducer assembly 28. The bracket 42 may be secured to the main support casting 11 by means of suitable connecting means passed through mounting hole 44. The top leg 46 of the E-shaped bracket 42 has a hole 48 therein, and the middle leg 50 of the bracket 42 contains a mounting pad 52 for supporting the bobbin 36 of the transducer assembly 28. The bobbin 36, which is generally rectangular in cross section, fits over the pad 52 and is therefore held in a fixed position relative to the record surface R. The inside surfaces of the bobbin ends straddle the pad 52. Two straight surfaces on the outside of the pad engage the outside corners of the bobbin to prevent motion in a direction parallel with the rotation of the recording surface R. The bottom leg 54 of the bracket 42 is provided with a positioning slot 56.

A holding clip 58 is secured to the bracket 42 by suitable means such as rivets and this clip holds the bobbin 36 against the pad 52. The holding clip 58 has an integral depending tongue 60 which overlies a V-shaped groove 62 in the outer surface of bracket 42. A link 64 is positioned in V-shaped groove 62 underlying the depending tongue 60 and is also passed through a teardrop-shaped hole 66 in the core laminations 34. This link is therefore pivotally attached to both the support bracket 42 and the movable components (core 34 and shoe 38) of the transducer assembly 28.

Means are provided for biasing the movable components of transducer 28 toward the recording surface R. These means include an elongated push rod 68 attached to the link 64, which push rod is biased by a conical-shaped or spiral spring 70 which acts between a collar 72 on the push rod and a flanged retainer 74 inserted in hole 48 in the top leg 46 of bracket 42 and secured therein by a hollow rivet. This arrangement allows the movable shoe 38 to freely ride upon the laminar film of fluid which will adhere to the recording surface R when it is moving rapidly and this movement will be in a radial direction toward and away from the recording surface R. The conical spring 70 is chosen to furnish the correct amount of bias to accurately adjust the position of the shoe 38 with respect to the recording surface R. The link 64 will prevent the movable components of the transducer assembly 28 from moving relative to the direction of movement of the recording surface R along the recording track.

Means are provided for preventing movement of the transducer shoe and core lamination in a direction transverse to the movement of the recording surface R and the recording track, which movement might be caused by excessive vibration. The means for preventing this side play include a pair of tongues 76 and 78, one of which is located on each end of the shoe 38. Tongue 76 extends into locating slot 56 and tongue 78 extends into a slot 80 provided on the dividing wall 18 of the casting 11. These slots and tongues allow the shoe 38 and core 34 to move vertically but prevent any side play.

Transducer assembly 26 is supported in a somewhat similar manner within support sub-housing casting 84. This casting has suitable side walls 86 and 88 both of which have locating slots 90 and 92 in the lower ends thereof. A back extension of housing 84 is provided with a suitable pad 94 for rigidly supporting a bobbin 98 of transducer assembly 26 in a similar manner to that previously described for the bobbin 36 of transducer assembly 28.

Transducer assembly 26 includes a laminated core 96 having a bobbin 98 which is rectangular in cross section assembled on one of its legs. A shoe 100 constructed of suitable laminated plastic material in a manner to be described hereinafter is rigidly secured to the core laminations 96 in such a manner as to position the nonmagnetic gap of the core 96 adjacent the recording surface R. The rigid securing means may be suitable rivets 102 or the like.

The laminated shoe 100 is provided with projecting tongues 104 and 106 on each end thereof for cooperating with slots 90 and 92 and preventing side play of the movable components of the transducer assembly 26.

The transducer assembly 26 is likewise supported by a single pivoted wire link 108 which is shown in detail in FIG. 2. Link 108 is connected to core laminations 96 by passing through an inverted teardrop-shaped hole 110 therein. A groove 112 which is V-shaped in section is provided in the bank surface of subhousing 84 for receiving the other end of link 108. A depending tongue 114 is provided to cover the groove 112 and hold the link 108 therein. This depending tongue is a portion of holding clip 116 which also functions to hold the bobbin 98 against the pad 94. Clip 116 is secured to the casting 84 by suitable rivets or the like 118 and may also be provided with a guide finger 120 for suitably guiding a push rod 122.

Push rod 122 is connected to link 108 by a cross connecting member 124. A spiral spring 126 is provided for acting upon a collar 128 secured to the push rod and a flanged retainer 130 secured to the housing, this spring is for the purpose of biasing the push rod and therefore the link and shoe and core toward the recording surface R. The elements described in connection with transducer assembly 26 are quite similar in nature to those described in connection with transducer assembly 28.

By providing separate supporting shoes for each transducer head, which shoes and their supported cores are independently biased toward the recording surface, the sensing gaps of both transducer cores will be referenced directly to the drum surface independently of each other. This eliminates any extremely accurate machining of the shoe surface which would be necessary if only a single shoe were utilized to support both transducer cores.

Suitable means are provided for magnetically shielding the transducers 26 and 28 from each other and thereby preventing cross-talk therebetween. This shielding means includes a heavy aluminum bar 18 which is part of the main housing casting 11 and a shield 132 made of suitable magnetic material such as mu metal which is adapted to be positioned around the entire transducer assembly 26. Shield 132 is assembled into slot 134 in front cover 12 and slot 20 in casting housing 11, and secured around transducer assembly 26 and the sub-housing 84 by means of a suitable screw 136 passing through slot 138 in the shield 132. This screw is threadedly engaged with a hole 140 in housing 11. The other side of cover plate 12 is secured to housing 11 by means of a screw 142 threadedly engaged in a hole 144. As shown in FIG. 1 dividing wall 18 and end wall 86 are positioned on each side of slot 20.

Means are provided for adjusting the spacing between the gaps of the transducer assemblies to vary the adjustment therebetween. For example, the spacing between the heads can range from 20 to 29 bits at a density of 88 bits to the inch, that is, approximately .1" adjustment may be made in this embodiment. The adjustment is in its broadest aspects similar to that described in aforesaid Patent 3,034,109. However, this adjustment is accomplished by sliding movement on an arc of a circle which has its center at the axis of rotation of the recording surface R. Therefore, the adjustment will be along an imaginary circle having its center at the axis of rotation R. This eliminates any change in the relative radial position of the magnetic transducer components and the recording surface R when an adjustment is made. The adjustment means include a curved top surface 146 of sub-housing casting 84 which mates with an arcuate spacer 148 having holes 150 and 152 therein. These holes are slightly larger and positioned to overlie threaded holes 154 and 156 in top surface 146 of subhousing casting 84. A pair of screws 158 and 160 are adapted to pass through elongated or slotted holes 162 and 164 and engage threaded holes 154 and 156 for adjustably securing the adjusted position of the housing 84 with respect to the stationary transducer assembly 28 and its associated parts.

The adjusting may be accomplished by rough and fine adjusting means. Means for making a rough adjustment consist of an adjusting tool 166 having an eccentric pin 168 on the lower end thereof. This pin is adapted to pass through a hole 170 in the top surface of main housing 11 and engage with an elongated slot 172 in the surface 146 of sub-housing casting 84. By rotating the tool 166 the housing 84 may be moved relative to the housing 11. This adjustment is made when the screws 160 and 158 are loosened to allow this relative movement. After this adjustment, which is considered a rough adjustment, is made screws 160 and 158 are tightened. For a finer adjustment a suitable adjusting screw 174 is threaded within hole 176 and is adapted to contact the surface of the spacer 148 and exert a pressure thereon and on the top surface 146 of subhousing 84. When adjusting screw 174 is rotated it will exert this pressure on top surface 146 thereby flexing this surface and causing the side surface 84 to move toward the right as viewed in FIGS. 1 and 3. The mechanics of the rough and fine adjustment are more fully described in aforementioned Patent 3,034,-109.

The salient features of the invention as disclosed in connection with the revolver can also be applied to a single magnetic head as shown in FIGS. 4 through 8. In the environment of supporting a single magnetic transducer head within a single support the present invention contemplates a housing 180 which is adapted to be secured to a suitable support S by means of screws 184. This will position the housing adjacent a recording surface R.

A transducer assembly 188 is provided with a laminated core 190 having a bobbin 192 operatively associated therewith in a manner similar to that described for each of the transducer assemblies in the revolver.

A shoe 194 is constructed of laminations and is rigidly secured to the core 190 by suitable rivets or the like 196. The shoe positions the movable core 190 with respect to the recording surface R such that the gap 198 in the core is the correct distance away from the recording surface R.

The housing 180 is provided with a pair of side members 200 and 202 which have slots 204 and 206 in the lower ends thereof. Projecting tongues 208 and 210 on the ends of shoe 194 cooperate with the slots to prevent side play of the shoe 194 and core 190 in a manner similar to that described above.

The shoe 194 and core 190 are movably mounted by means of a single wire link 212. One end of line 212 is positioned within a V-shaped groove 214 in side wall 202 and is held therein by a clip 216. A loop 218 in the other end of link 212 engages the lower end of a push rod 220 the upper end of which is biased downwardly by means of a spiral spring 222 acting between a collar 224 attached to push rod 220 and a retainer ring 226 assembled within housing 180. A crossbar 228 is provided on the link and this crossbar engages in a groove 230 which is V-shaped to provide suitable pivotable mounting of the shoe 194 and core 190.

The construction of the shoe 194 is similar to the construction of the shoes 38 and 100 in the revolver assembly although these shoes were not described in detail. More specifically, the shoes are constructed from a plurality of stampings of plastic laminations 232 which are assembled together. A central lamination 234 is machined of the same plastic material and the laminated metal core 190 is assembled between the laminations and is secured therein when the laminations are assembled by suitable rivets. A nonmagnetic material such as a phosphor bronze insert 236 is provided in the gap of the core 190 in a manner known in the art. One of the central plastic laminations is longer than the others thereby providing the ears 208 and 210 on each end of the shoe 194. Final machining of the shoe surface may be done after assembly, thereby positioning the gap with absolute accuracy with respect to the shoe, which in turn is referenced directly to the recording surface.

It is believed that the operation of the aforedescribed constructions will be apparent from the foregoing description. However, a summary of the operation of the mounting means for the head will be described, it being considered that the operation of the mounting means for the revolver are sufficiently similar to enable it to be apparent from the description of the mounting means for the head. When the device is in operation and the recording surface R is traveling at a rapid rate a thin laminar film of fluid will adhere closely thereto and this will position shoe 194 and consequently gap 196 of core 190 closely adjacent the recording surface. The shoe and core and sensing gap will be free to move in a radial direction toward and away from the center of rotation of the recording surface R. However, movement will be restrained in a direction parallel with the movement of the recording surface R, that is, the core 190 and its gap 198 will be prevented from moving along the recording track by means of the link 212 which cooperates with V-shaped groove 230 with its crossbar 228. The movable components of the transducer assembly 188 are biased toward the recording surface R by conical spring 222 acting on push rod 220. This spring is susceptible to close calibration and will not buckle as would an elongated helical spring. The movable components of the transducer assembly 188 will also be prevented from side slip by means of tongues 208 and 210 of the shoe 194 cooperating with grooves 204 and 206 in the housing 180.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An apparatus for manifesting intelligence on a cyclicly rotatable record medium which is adapted to rapidly traverse a path closely adjacent said apparatus, said apparatus comprising; a supporting housing, a sensing mechanism which is movably mounted relative to said housing, said sensing mechanism including shoe means rigidly connected therewith for supporting said sensing element in closely spaced relation to said record medium during the rapid traversal thereof, said shoe means having a substantial surface which conforms to the surface of the record medium whereby said shoe member and sensing mechanism will be supported by the laminar fluid boundary which adheres to the surface of the record medium during the rapid movement thereof, a single elongated wire loop link member pivotally attached to said support housing and said sensing mechanism for allowing said sensing mechanism to move toward and away from the surface of said record medium while preventing movement in the direction of said record medium movement, and spring means biasing said link member and movable sensing element toward the surface of the record medium.

2. A device as defined in claim 1 wherein said pivotal connection between said link and said support housing includes a V notch in said support housing for receiving said link, and a leaf spring covering said notch for holding said link therein.

3. A device as defined in claim 1 wherein said biasing means comprises a spiral spring positioned to bias an elongated push rod, which push rod is attached to said link.

4. A device as defined in claim 1 further comprising interengaging means on said shoe and housing for preventing said shoe from moving in a direction transverse to the movement of said record medium.

5. A device as defined in claim 4 wherein said interengaging means includes a projecting tongue member on each said shoe which cooperates with complementary slots in said housing.

6. A device as defined in claim 5 wherein said shoe is constructed of a plurality of insulating laminations rigidly secured together, at least one of said laminations extending beyond the ends of said other laminations to form said tongues.

7. An apparatus for reading or writing manifestations of intelligence on a rotatable magnetizable record medium, said apparatus comprising; a support member which is adapted to be positioned closely adjacent the path traversed by said record medium, a coil supported in fixed relation to said support member, a sensing element operatively associated with said coil and movable relative thereto, shoe means rigidly connected to said sensing element for positioning said sensing element closely adjacent the path traversed by the surface of said record medium, and a single link supporting member, said link being pivotally attached to said housing and to said sensing element for floatingly supporting said sensing element for movement toward and away from the rotative axis of said record medium to compensate for any eccentricity thereof, while preventing movement along the recording track in the direction of the movement of said record medium, and cooperating means on said shoe and housing for preventing movement of said shoe and sensing element transversely to the movement of said record medium.

8. In combination, a record medium, apparatus for manifesting intelligence on said record medium, means for mounting said apparatus adjacent said record medium, said apparatus comprising a coil assembly which is fixed with respect to said mounting means, and a core structure associated with said coil assembly and movable relative thereto, shoe means rigidly connected to said core structure adjacent said record medium for supporting said core structure closely adjacent to said record medium on the laminar fluid film which will adhere thereto during rapid movement, a single link pivotally connected to said mounting means and said shoe, a push rod secured to said link adjacent the outer end thereof, and a spiral spring between said mounting means and said push rod for biasing said push rod and thereby said shoe and core structure associated therewith toward the surface of said record medium.

9. Apparatus for manifesting intelligence on a magnetizable record medium which is adapted to rapidly traverse a path closely adjacent said apparatus, comprising; a housing, a pair of magnetic transducer heads mounted in said housing, each of said heads including a coil fixed in relationship to said housing and a core movable relative thereto, each said core being rigidly attached to a supporting shoe element, means on said shoe cooperating with said housing for preventing movement of said shoe and said core transverse to the movement of said record medium, a pair of links each pivotally connected at one end to said housing and at the other end to one of said cores for allowing said cores to move toward and away from the surface of said record medium while preventing movement parallel thereto, and means biasing said pivoted link and the movable elements carried thereby toward the surface of said record medium.

10. A device as defined in claim 9 further comprising a separable magnetic shield adapted to be positioned to surround one of said transducer assemblies to prevent cross talk between said transducers.

11. An apparatus for manifesting intelligence on a record medium which is adapted to rapidly traverse a path closely adjacent said apparatus, said apparatus comprising; a support member, a sensing element, a shoe attached to said sensing element and having a relatively large surface adjacent said record member whereby said shoe functions to position said sensing element with respect to the laminar boundary of fluid which adheres to the surface of the record medium during rapid movement thereof, said sensing element and said shoe being movable relative to said support member, a link pivotally attached to said support member and to one of said elements which are movable relative thereto, an elongated push rod connected to said link, and a spiral spring between said support member and said push rod biasing said push rod, said link, and said movable elements toward the surface of said record medium.

12. A device as defined in claim 11 further comprising means for preventing movement of said movable elements transverse to the direction of movement of said record medium.

13. A device as defined in claim 11 wherein said shoe has a tongue projecting therefrom and said support member has a slot therein for receiving said tongue with close tolerances thereby forming said means for preventing the movement of said shoe and sensing element connected thereto transverse to the path of movement of said record medium.

14. A device as defined in claim 13 wherein said shoe is constructed of a plurality of laminations and wherein said sensing element includes a laminated core attached to said laminated shoe and movable therewith and a coil supported in fixed relation to said support member and operatively associated with said core.

15. Magnetic transducer apparatus for use with a magnetizable record medium which is adapted to rapidly traverse a path closely adjacent said transducer apparatus, said apparatus comprising; a support housing, a coil supported in fixed relation to said housing, a core operatively associated with said coil and movable relative thereto, a support shoe having a relatively large surface adjacent said record medium, said shoe being attached to said core, a pair of projections on said shoe cooperating with said housing for preventing movement of said shoe in a direction perpendicular to the direction of movement of said magnetizable record medium, a link for supporting said core for movement toward and away from the surface of said magnetizable record medium while preventing movement in the direction of movement of the surface of said magnetizable record medium, said link being pivotally attached to said housing by being positioned in a V shaped notch and overlapped by a leaf spring, said link also being adapted to cooperate with a V shaped pivot on said shoe, a push rod secured to the end of said link opposite said pivotal attachment to said housing, and a spiral spring cooperating with the upper end of said push rod and said housing to bias said push rod thereby biasing said link, core and shoe toward the surface of said magnetizable record medium.

16. Magnetic transducer apparatus for use with a cylindrical magnetizable record which is adapted to traverse a path closely adjacent thereto, said apparatus comprising a housing having a generally arcuate inner surface, first and second magnetic transducers carried within said housing, a support for one of said magnetic transducers rigidly secured to said housing, and a support for the other of said magnetic transducers secured in an adjustable manner to said housing, said adjustable support having an arcuate surface cooperating with the arcuate surface of said housing, the center of said arcuate surfaces being coincident with the axis of rotation of said cylindrical magnetizable record, each of said transducers including a coil fixed in relation to said support and a core with a supporting shoe rigidly attached thereto, said core and shoe being movable together relative to said support, a single closed loop link pivotally connected to said support and said core for supporting said core and shoe for movement toward and away from the axis of said magnetizable record member while preventing movement of said core along the path of said magnetizable record member movement, a projecting tongue on end of each of said shoes cooperating with slots in said housing for preventing movement of said shoe and said core in a direction perpendicular to the movement of said record member, a push rod connected to said closed loop link intermediate its ends, a spiral spring cooperating between said housing and a collar on said push rod to bias said link and said link, core, and shoe toward the surface of said record member, and a magnetic shield positioned around one of said transducer assemblies and its support member for magnetically insulating said transducers from one another.

References Cited in the file of this patent

UNITED STATES PATENTS

| | | |
|---|---|---|
| 2,761,016 | Muller | Aug. 28, 1956 |
| 2,827,355 | Lubkin | Mar. 18, 1958 |
| 2,862,064 | Wallace | Nov. 25, 1958 |
| 2,863,004 | Maclay et al. | Dec. 2, 1958 |
| 2,915,593 | Brown | Dec. 1, 1959 |
| 2,950,354 | Hohnecker | Aug. 23, 1960 |